United States Patent
Kimura et al.

(10) Patent No.: US 6,869,489 B2
(45) Date of Patent: Mar. 22, 2005

(54) STEEL FOR HIGH BEARING PRESSURE-RESISTANT MEMBER, HAVING HIGH MACHINABILITY, AND HIGH BEARING PRESSURE-RESISTANT MEMBER USING SAME STEEL

(75) Inventors: Toshimitu Kimura, Nagoya (JP); Tatsuomi Nakayama, Kanagawa (JP); Hiroo Ueda, Kanagawa (JP); Noriko Uchiyama, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/854,673

(22) Filed: May 15, 2001

(65) Prior Publication Data

US 2002/0000267 A1 Jan. 3, 2002

(30) Foreign Application Priority Data

May 17, 2000 (JP) ........................................ 2000-145155

(51) Int. Cl.$^7$ .............................. C22C 38/44; C21D 9/40
(52) U.S. Cl. ....................... 148/319; 148/328; 148/225; 148/622
(58) Field of Search ................................ 148/225, 319, 148/328, 622

(56) References Cited

U.S. PATENT DOCUMENTS

| | | | | |
|---|---|---|---|---|
| 4,773,947 A | * | 9/1988 | Shibata et al. | 148/221 |
| 5,107,711 A | * | 4/1992 | Aoki et al. | 73/862.36 |
| 5,746,842 A | * | 5/1998 | Eguchi et al. | 148/319 |
| 5,922,145 A | * | 7/1999 | Watari et al. | 148/320 |

FOREIGN PATENT DOCUMENTS

| | | | | |
|---|---|---|---|---|
| DE | 19955565 A1 | * | 6/2000 | ........... C22C/38/24 |
| EP | 1069198 A1 | * | 1/2001 | ........... C22C/38/60 |
| JP | 61-174321 A | * | 8/1986 | ........... C21D/6/00 |
| JP | 62-260042 A | * | 11/1987 | ........... C22C/38/26 |
| JP | 05-059427 A | * | 3/1993 | ........... C22C/38/40 |
| JP | 06-287712 A | * | 10/1994 | ........... C22C/38/22 |
| WO | WO 2000/00658 A1 | * | 1/2000 | ........... C22C/38/44 |

OTHER PUBLICATIONS

Bramfitt et al, "Annealing of Steel", ASM Handbook, vol. 4 Heat Treating, 1991, pp. 42, 46, 47.*
Wisti et al, "Tempering of Steel", ASM Handbook, vol. 4 Heat Treating, 1991, p. 121.*
Lampman, "Introduction to Surface Hardening of Steels", ASM Handbook, vol. 4 Heat Treating, 1991, pp. 259–263.*

* cited by examiner

Primary Examiner—Roy King
Assistant Examiner—Harry D. Wilkins, III
(74) Attorney, Agent, or Firm—Foley & Lardner LLP

(57) ABSTRACT

A steel for a high bearing pressure-resistant member, having a high machinability. The steel is formed of a machine structural steel comprising carbon in an amount ranging from 0.15 to 0.25% by weight, silicon in an amount of not less than 0.4% by weight, nickel in an amount ranging from 1 to 3% by weight, chromium in an amount ranging from 1.2 to 3.2% by weight, and molybdenum in an amount ranging from 0.25 to 2.0% by weight. The machine structural steel contains carbide precipitated under a heat treatment for spheroidizing. The carbide has an average particle size of not larger than 1 μm and the maximum particle size of not larger than 3 μm.

24 Claims, 3 Drawing Sheets

×2000

STEEL FOR HIGH BEARING PRESSURE-RESISTANT MEMBER, HAVING HIGH MACHINABILITY, AND HIGH BEARING PRESSURE-RESISTANT MEMBER USING SAME STEEL

BACKGROUND OF THE INVENTION

This invention relates to improvements in a production technique for high bearing pressure-resistant members such as discs and input and output power rollers used in a toroidal continuously variable transmission and gears, and more particularly to steels for the high bearing pressure-resistant members which steels are improved in machinability upon undergoing a heat treatment for spheroidizing and to high bearing pressure-resistant members formed of such steels.

It has been hitherto known that a machine structural steel containing 0.15 to 0.25% by weight of C, not less than 0.4% by weight of Si and 1 to 3% by weight of Ni is formed into a high bearing pressure-resistant member excellent in performance upon undergoing a surface hardening treatment such as carburizing or carbonitriding. In case of producing a high bearing pressure-resistant member by using such a machine structural steel, it is required to make a softening heat treatment on the machine structural steel prior to machining since the machinability of the machine structural steel as a raw material steel is very low upon hot working, in order to obtain objective shape and dimensions under machining.

SUMMARY OF THE INVENTION

However, in the above conventional machine structural steel having the above composition, it has been impossible to sufficiently improve the machinability of the machine structural steel by applying the softening heat treatment. More specifically, if normalizing at temperatures over 820° C. is applied to the machine structural steel, transformation to martensite or bainite occurs in the structure of the steel. If low annealing at temperatures lower than 700° C. is applied to the machine structural steel, precipitation and growth of spheroidized carbide in the structure of the machine structural steel is insufficient, and therefore the hardness of the machine structure steel cannot be lowered. If heat treatment for spheroidizing is accomplished at temperatures of 700 to 800° C. on the machine structural steel, the hardness of the machine structural steel is lowered; however, the size of carbide becomes large. This shortens the life of a tool for machining, so that improvement in machinability of the steel cannot be expected thereby making difficult mass production of high bearing pressure-resistant members.

It is an object of the present invention to provide an improved steel (machine structural steel) for a high bearing pressure-resistant member, which can overcome drawbacks encountered in conventional machine structural steels.

Another object of the present invention is to provide an improved steel for a high bearing pressure-resistant member, which is improved in machinability and therefore largely improved in productivity for the high bearing pressure-resistant member.

A further object of the present invention is to provide an improved high bearing pressure-resistant member which is produced using the improved steel and therefore excellent in fatigue-resistance characteristics and productivity.

An aspect of the present invention resides in a steel for a high bearing pressure-resistant member, having a high machinability. The steel is formed of a machine structural steel comprising carbon (C) in an amount ranging from 0.15 to 0.25% by weight, silicon (Si) in an amount of not less than 0.4% by weight, nickel (Ni) in an amount ranging from 1 to 3% by weight, chromium (Cr) in an amount ranging from 1.2 to 3.2% by weight, and molybdenum (Mo) in an amount ranging from 0.25 to 2.0% by weight. The machine structural steel contains carbide precipitated under a heat treatment for spheroidizing. The carbide has an average particle size of not larger than 1 μm and the maximum particle size of not larger than 3 μm.

Another aspect of the present invention resides in a high bearing pressure-resistant member made of a steel which has a high machinability. The steel is formed of a machine structural steel comprising carbon in an amount ranging from 0.15 to 0.25% by weight, silicon in an amount of not less than 0.4% by weight, nickel in an amount ranging from 1 to 3% by weight, chromium in an amount ranging from 1.2 to 3.2% by weight, and molybdenum in an amount ranging from 0.25 to 2.0% by weight, the machine structural steel containing carbide precipitated under a heat treatment for spheroidizing, the carbide having an average particle size of not larger than 1 μm and the maximum particle size of not larger than 3 μm. The machine structural steel undergoes one of a first treatment and a second treatment after the spheroidizing heat treatment. The first treatment includes hardening the machine structural steel by carburizing, and tempering the hardened machine structural steel. The second treatment includes hardening the machine structural steel by carbonitriding, and tempering the hardened machine structural steel.

A further aspect of the present invention resides in a method of producing a steel for a high bearing pressure-resistant member, having a high machinability. The method comprises (a) preparing a machine structural steel comprising carbon in an amount ranging from 0.15 to 0.25% by weight, silicon in an amount of not less than 0.4% by weight, nickel in an amount ranging from 1 to 3% by weight, chromium in an amount ranging from 1.2 to 3.2% by weight, and molybdenum in an amount ranging from 0.25 to 2.0% by weight; and (b) applying a heat treatment for spheroidizing on the machine structural steel so that carbide is precipitated in the machine structural steel, the carbide having an average particle size of not larger than 1 μm and the maximum particle size of not larger than 3 μm.

A still further aspect of the present invention resides in a method of producing a high bearing pressure-resistant member, having a high machinability. The method comprises (a) preparing a machine structural steel comprising carbon in an amount ranging from 0.15 to 0.25% by weight, silicon in an amount of not less than 0.4% by weight, nickel in an amount ranging from 1 to 3% by weight, chromium in an amount ranging from 1.2 to 3.2% by weight, and molybdenum in an amount ranging from 0.25 to 2.0% by weight; (b) applying a heat treatment for spheroidizing on the machine structural steel so that carbide is precipitated in the machine structural steel, the carbide having an average particle size of not larger than 1 μm and the maximum particle size of not larger than 3 μm; (c) machining the machine structural steel to have predetermined shape and dimensions; and (d) applying one of a first treatment and a second treatment on the machine structural steel after the machining, the first treatment including hardening the machine structural steel by carburizing, and tempering the hardened machine structural steel, the second treatment including hardening the machine structural steel by carbonitriding, and tempering the hardened machine structural steel.

DETAILED DESCRIPTION OF THE INVENTION

Figure 1:
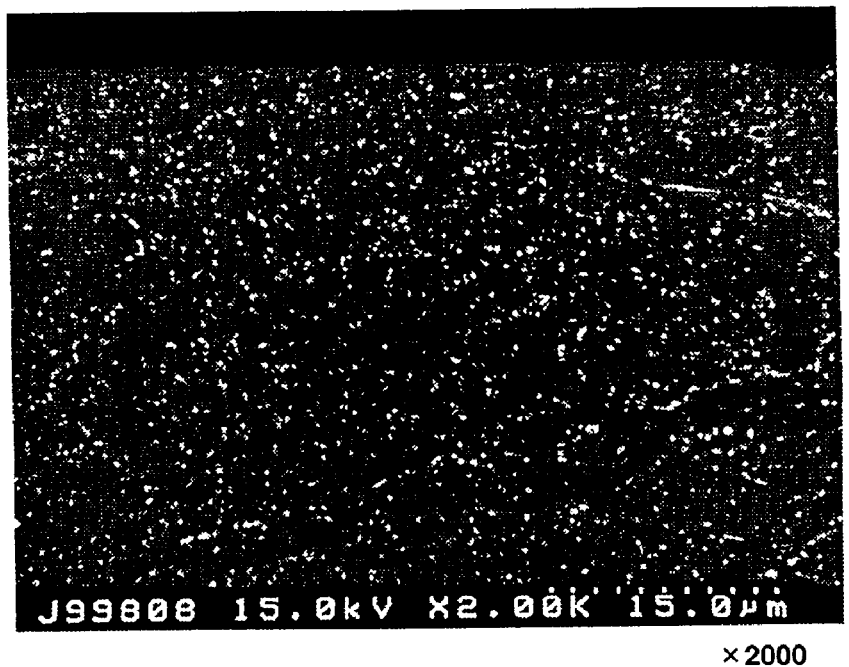
FIG. 1 is a microphotograph (at 2000 magnifications) showing the metallographic structure of a steel for a high bearing pressure-resistant member, according to the present invention.

According to the present invention, a steel for a high bearing pressure-resistant member, having a high machinability, is formed of a machine structural steel comprising carbon (C) in an amount ranging from 0.15 to 0.25% by weight, silicon (Si) in an amount of not less than 0.4% by weight, nickel (Ni) in an amount ranging from 1 to 3% by weight, chromium (Cr) in an amount ranging from 1.2 to 3.2% by weight, and molybdenum (Mo) in an amount ranging from 0.25 to 2.0% by weight. The machine structural steel contains carbide precipitated under a heat treatment for spheroidizing. The carbide has an average particle size of not larger than 1 μm and the maximum particle size of not larger than 3 μm.

Hitherto, there has been a knowledge that spheroidized hard carbide in steel is better than to have hard carbide having lamellar or acicular structure from the viewpoint of machinability of steel. However, if the particle size or diameter of carbide is large even in case of being spheroidized, damage against a tool is considerable. According to the present invention, the machine structural steel to which 1.2 to 3.2% by weight of Cr and 0.25 to 2.0% by weight of Mo are added undergoes the spheroidizing heat treatment, so that hard carbide is precipitated to have the average particle size of not larger than 1 μm and the maximum particle size of not larger than 3 μm. With such machine structural steel, shearing force during machining or cutting can be softened while suppressing impact of hard substance or carbide on the cutting blade of a tool. Accordingly, the machine structural steel of the present invention is excellent in machinability.

According to the present invention, Cr is an element necessary for forming carbide, particularly $M_{23}C_6$ carbide. Cr largely contributes to obtain a high surface hardness of the machine structural steel in a condition of a final or complete product upon making a surface hardening treatment such as carburizing, carbonitriding or the like. Additionally, Cr improves a rolling fatigue strength of the machine structural steel and prevents coarsening of carbide during the spheroidizing heat treatment thereby forming fine carbide. In this connection, if the content of Cr is less than 1.2% by weight, the above effects cannot be expected. If the content of Cr exceeds 3.2% by weight, the amount of carbide precipitated becomes too large thereby inviting lowering in machinability of the machine structural steel. Mo contributes to promoting the above-discussed effects upon being added together with Cr to the machine structural steel, while contributing to stably precipitating $M_{23}C_6$ carbide. If the content of Mo is less than 0.25% by weight, precipitation of the above-mentioned carbide cannot be expected. If the content of Mo exceeds 2.0% by weight, the machinability of the machine structural steel is degraded similarly to an increase in the amount of Cr.

The carbide contains at least one of MC carbide, $M_2C$ carbide, $M_7C_3$ carbide, $M_{23}C_6$ carbide, and $M_6C$ carbide. This makes difficult coarsening of carbide during the spheroidizing heat treatment, so that the average particle size of the precipitated carbide does not exceed 1 μm while the maximum particle size does not exceed 3 μm. As a result, the machine structural steel is lowered in hardness, thereby softening impact on the tool during machining and improving the machinability thereof.

The machine structural steel has a Vickers hardness (Hv) ranging from 180 to 250 after undergoing the spheroidizing heat treatment. This makes appropriate a cutting force and the length of chip produced during cutting the machine structural steel, thus improving the machinability of the machine structural steel. More specifically, if the hardness (Hv) exceeds 250, a resistance applied to the tool during cutting becomes excessive so that breakage and damage of the tool tends to be readily made thereby rendering machining of the machine structural steel difficult. If the hardness (Hv) is lower than 180, ductility of the machine structural steel as a raw material is high, and therefore a contact area between the tool and cutting chip increases during machining, for example, by a lathe, thus to provide a possibility of promoting wear of the tool.

The spheroidizing heat treatment includes a first step of maintaining the machine structural steel at a temperature ranging from 700 to 820° C.; and a second step of cooling the machine structural steel to a temperature of 600° C. at a cooling rate of not higher than 20° C. per one hour. This spheroidizing heat treatment causes precipitation of carbide which contains at least one of MC carbide, $M_2C$ carbide, $M_2C_3$ carbide, $M_{23}C_6$ carbide and $M_6C$ carbide, and which has the average particle size of not larger than 1 μm and the maximum particle size of not larger than 3 μm, and the hardness (Hv) ranging from 180 to 250. Accordingly, the machinability of the machine structural steel containing such carbide is improved. In the spheroidizing heat treatment, if the maintained temperature is lower than 700° C., precipitation of carbide is insufficient. If the maintained temperature exceeds 820° C., austenite phase is produced in the machine structural steel, upon which the austenite phase may be transformed to martensite and/or bainite according to a cooling condition succeeding to the temperature maintaining step so that the hardness of the machine structural steel does not lower. Additionally, if the cooling in the spheroidizing heat treatment is accomplished at a cooling rate over 20° C. per one hour, a part of the matrix of the machine structural steel is transformed to bainite so that the hardness of the machine structural steel cannot sufficiently lower.

The machine structural steel undergoes one of a first treatment and a second treatment after being subjected to the spheroidizing heat treatment and after being subjected to machining for obtaining a predetermined shape and predetermined dimensions. The first treatment includes hardening the machine structural steel by carburizing, and tempering the hardened machine structural steel. The second treatment includes hardening the machine structural steel by carbonitriding, and tempering the hardened machine structural steel. As a result, the machine structural steel becomes a steel suitable for the high bearing pressure-resistant member, which is excellent in rolling fatigue characteristics and in productivity.

EXAMPLES

The present invention will be more readily understood with reference to the following Examples in comparison with Comparative Examples; however, these Examples are intended to illustrate the invention and are not to be construed to limit the scope of the invention.

Five kinds of machine structural steels shown in Table 1 underwent hot forging to respectively prepare five kinds of raw material steels Nos. 1 to 5 for high bearing pressure-resistant members. The raw material steels Nos. 1 to 3 were of Examples according to the present invention. The raw material steels Nos. 4 and 5 were of Comparative Examples which were outside the scope of the present invention.

TABLE 1

| Sample | Raw material steel No. | Chemical composition (wt %) | | | | | | |
|---|---|---|---|---|---|---|---|---|
| | | C | Si | Mn | Ni | Cr | Mo | Other |
| Example (Present invention) | 1 | 0.18 | 0.51 | 1.22 | 2.83 | 3.01 | 0.45 | — |
| | 2 | 0.20 | 0.98 | 0.33 | 2.00 | 2.03 | 0.68 | V: 0.2 |
| | 3 | 0.25 | 1.23 | 0.42 | 1.15 | 1.45 | 1.67 | Nb: 0.01 |
| Comparative Example | 4 | 0.20 | 1.01 | 0.76 | 2.21 | 0.15 | 0.15 | — |
| | 5 | 0.22 | 0.42 | 0.36 | 1.32 | 3.35 | 0.02 | — |

Prior to undergoing a rough machining, each raw material steel was subjected to one of two kinds of heat treatments for softening, one of the heat treatments being a normalizing treatment in which the raw material steel was heated at 850° C. and thereafter air-cooled, and the other being a spheroidizing heat treatment in which the raw material steel was heated and maintained at 760° C. and thereafter cooled to 600° C. at a cooling rate of 15° C. per one hour in a furnace. As a result, 10 kinds of specimen steels as shown in Table 2 were prepared. Tests were conducted on the 10 kinds of the specimen steels to determine Vickers hardness (Hv) of each specimen steel, kind and average particle size of carbide precipitated in each specimen steel. Results of the tests are shown in Table 2.

TABLE 2

| Sample | Specimen steel No. | Raw material steel No. | Heat treatment | Hardness (Hv) | Carbide (type) | Average particle size (μm) |
|---|---|---|---|---|---|---|
| Example (Present invention) | 1 | 1 | Spheroidizing heat treatment | 185 | $M_{23}C_6$ | 0.3 |
| | 2 | 2 | Spheroidizing heat treatment | 220 | $M_{23}C_6$, MC | 0.4 |
| | 3 | 3 | Spheroidizing heat treatment | 245 | $M_7C_3$, $M_2C$ | 0.3 |
| Comparative Example | 4 | 4 | Spheroidizing heat treatment | 170 | $M_3C$ | 1.2 |
| | 5 | 5 | Spheroidizing heat treatment | 230 | $M_7C_3$ | 1.1 |
| | 6 | 1 | Normalizing treatment | 330 | $M_7C_3$ | 0.3 |
| | 7 | 2 | Normalizing treatment | 400 | Unprecipitated | — |
| | 8 | 3 | Normalizing treatment | 455 | Unprecipitated | — |
| | 9 | 4 | Normalizing treatment | 215 | $M_3C$ | 0.8 |
| | 10 | 5 | Normalizing treatment | 340 | Unprecipitated | — |

As depicted in Table 2, conventional steels (the raw material steels Nos. 4 and 5) containing very small amounts of Cr and/or Mo have the average particle size exceeding 1 μm after the spheroidizing heat treatment.

Concerning the specimen steel No. 2 (Example) and the specimen steel No. 7 (Comparative Example) respectively as typical examples of Example and Comparative Example:

The specimen steel No. 2 corresponds to a steel of the present invention (for a high bearing pressure-resistant member) which was obtained by causing the raw material steel No. 2 to undergo the spheroidizing heat treatment. A microphotograph (at 2000 magnifications) in FIG. 1 reveals that the average particle size of carbide (shown as bright dots) in the specimen steel No. 2 is not larger than 1 μm, and that large carbide having the particle size exceeding 2 μm cannot be recognized at all. The structure of such carbide was inspected by an electron diffraction pattern, in which existence of $M_{23}C_6$ was recognized.

Figure 2:
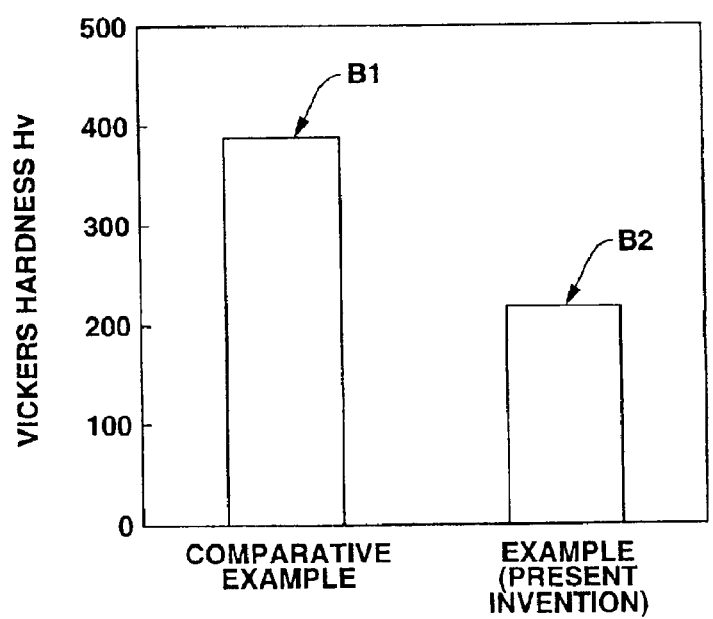
FIG. 2 is a graph showing comparison in Vickers hardness between a steel of Example (the present invention) and a steel of Comparative Example (in which normalizing was made)

The specimen steel No. 2 was obtained by causing the raw material steel No. 2 to undergo the spheroidizing heat treatment, whereas the specimen steel No. 7 was obtained by causing the raw material steel No. 2 to undergo the normalizing treatment. Measurement of Vickers harness (Hv) was conducted at a load of 300 gf on the specimen steel Nos. 2 and 7 to obtain results shown as a bar graph in FIG. 2 in which a bar B1 indicates the hardness of the specimen steel No. 7 (Comparative Example) whereas a bar B2 indicates the hardness of the specimen steel No. 2 (Example). The bar graph of FIG. 2 depicts that the structure of the specimen steel No. 7 (Comparative Example) was very hard to have a hardness (Hv) of about 400 whereas the structure of the specimen steel No. 2 (Example) was low in hardness to have a hardness (Hv) of 220.

Figure 3:
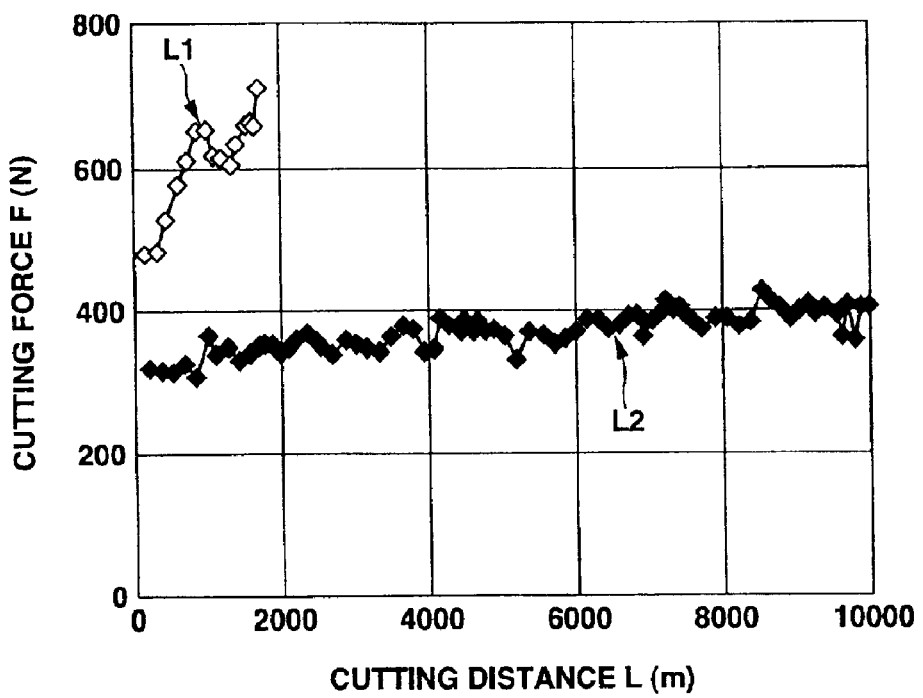
FIG. 3 is a graph showing comparison in cutting force in terms of cutting distance, between the steel of Example (the present invention) and the steel of Comparative Example (in which normalizing was made)

Additionally, measurement of the cutting force F (N) in terms of a cutting distance L (m) of the specimen tool was conducted on the specimen steel Nos. 2 and 7 to obtain results shown as a graph in FIG. 3 in which a line L1 indicates the cutting force of the specimen steel No. 7 whereas a line L2 indicates the cutting force of the specimen steel No. 2. The cutting force F means a load applied to the tool during cutting of the specimen steel. The cutting distance L means a total distance in which cutting was made by the tool. The graph of FIG. 3 reveals that the cutting force is low in the specimen steel No. 2 (Example) as compared with the specimen steel No. 7 (Comparative Example). Additionally, it is also revealed that the length of cutting chips produced during cutting of the specimen steel No. 2 is proper, which will largely improve the productivity of final products while making possible mass production of final products. The measurement of the cutting force was made during cutting of the specimen steel, in which the cutting was accomplished by using a hard metal tool under a condition in which the test piece of the specimen steel had a diameter of 60 mm; the feeding speed of the test piece was 0.3 mm/rev. (revolution); the depth of cut was 1 mm; and the cutting speed was 120 m/min.

Figure 4:
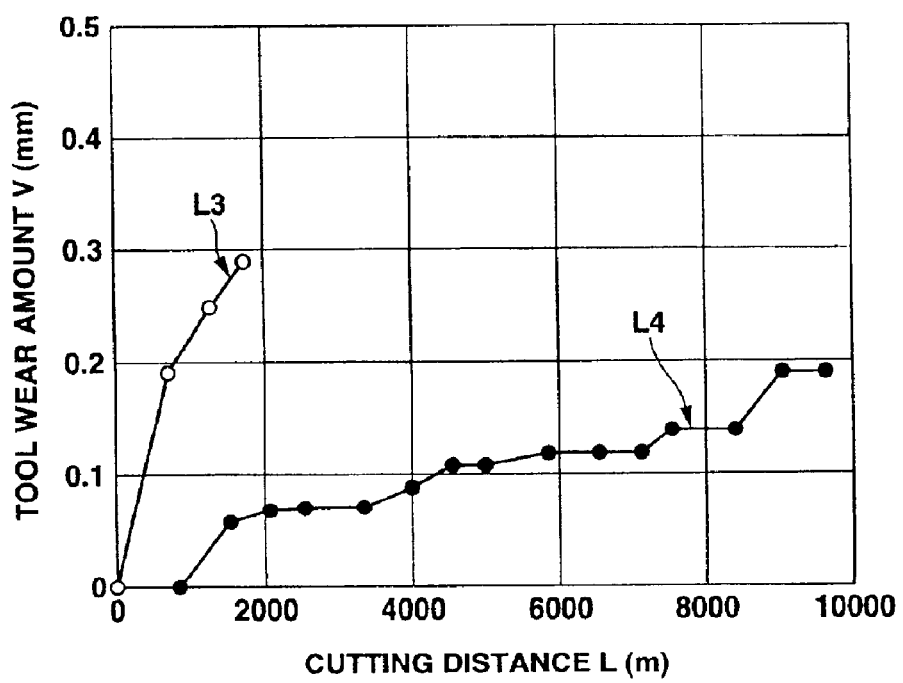
FIG. 4 is a graph showing comparison in tool wear amount in terms of cutting distance, between the steel of Example (the present invention) and the steel of Comparative Example (in which normalizing was made)

Further, measurement of a wear amount V (mm) of the tool of a lathe during a lathe turning in terms of the cutting distance was conducted on the specimen steel Nos. 2 and 7 to obtain results shown as a graph in FIG. 4 in which a line L3 indicates the wear amount V of the specimen No. 2 (Example) whereas a line L4 indicates the wear amount V of the specimen steel No. 7 (Comparative Example). The wear amount V means an amount or distance of wear of the tool. This graph of FIG. 4 depicts that the specimen steel No. 2 (Example) of the present invention largely reduces the wear amount of the tool and ensures a tool life of not less than 5 times that of the specimen steel No. 7 (Comparative Example). Thus, it is confirmed that the specimen steels of the present invention are superior in its machinability.

Thereafter, the specimen steel Nos. 1 to 10 shown in Table 2 were subjected to cutting by using the hard metal tool under the condition in which the test piece of the specimen steel had a diameter of 60 mm; the feeding speed of the test piece was 0.3 mm/rev. (revolution); the depth of cut was 1 mm; and the cutting speed was 120 m/min. During this cutting, the cutting force at the cutting distance of 1000 m and the cutting distance at which the wear amount of the tool reached 0.2 mm were measured to obtain results shown in Table 3.

TABLE 3

| Sample | Specimen steel No. | Cutting force (N) at cutting distance of 10000 m | Cutting distance (m) at which tool wear amount reached 0.2 mm |
| --- | --- | --- | --- |
| Example (Present invention) | 1 | 380 | 12000 |
| | 2 | 400 | 10000 |
| | 3 | 420 | 8800 |
| Comparative Example | 4 | Impossible to be measured owing to breakage of tool | 2200 |

TABLE 3-continued

| Sample | Specimen steel No. | Cutting force (N) at cutting distance of 10000 m | Cutting distance (m) at which tool wear amount reached 0.2 mm |
| --- | --- | --- | --- |
| | 5 | Impossible to be measured owing to breakage of tool | 1400 |
| | 6 | Impossible to be measured owing to breakage of tool | 800 |
| | 7 | Impossible to be measured owing to breakage of tool | 700 |
| | 8 | Impossible to be measured owing to breakage of tool | 300 |
| | 9 | Impossible to be measured owing to breakage of tool | 1300 |
| | 10 | Impossible to be measured owing to breakage of tool | 700 |

Table 3 reveals that the steels according to the present invention are remarkably excellent in machinability.

Figure 5:
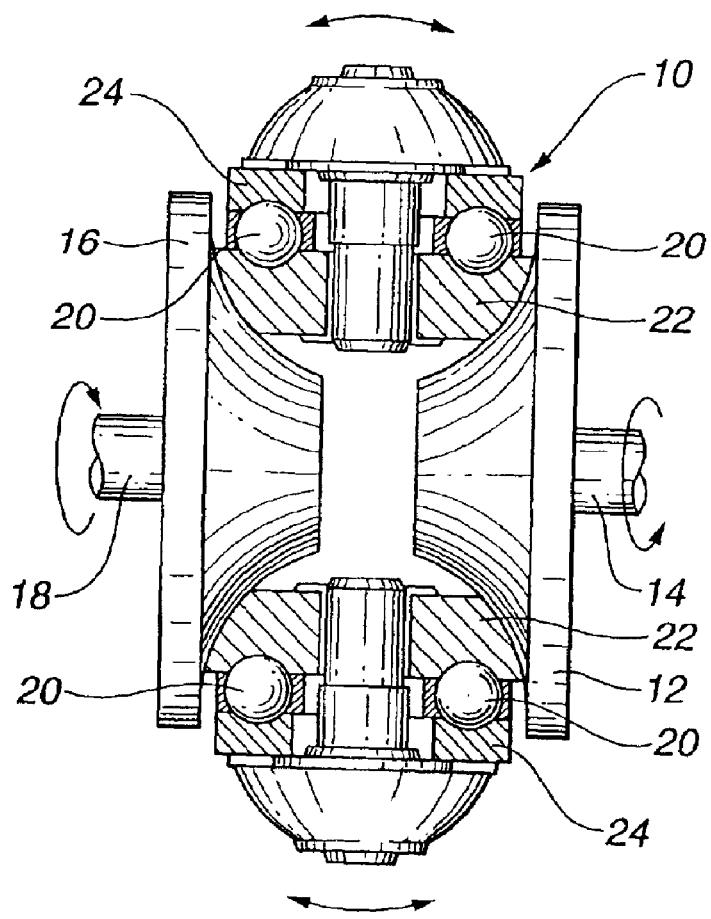
FIG. 5 is a fragmentary front view, partly in section, of an essential part of a toroidal continuously variable transmission having component part(s) made of the steel according to the present invention.

The steels according to the present invention after being subjected to the softening heat treatment undergo cutting by lathe turning to obtain steels for the high bearing pressure-resistant member, having a predetermined shape and predetermined demensions. Such steels then undergo a surface hardening treatment such as carburizing hardening or carbonitriding hardening, followed by undergoing a tempering. Thereafter, the steels are finally grinded to form high bearing pressure-resistant members such as component parts of a toroidal continuously variable transmission as shown in FIG. 5. The toroidal continuously variable transmission includes power input and output discs 12, 16 which are generally symmetrically and rotatably disposed. Power input and output discs 12, 16 have respectively power input and output shafts 14, 18. Power rollers 5 are rotatably disposed between respective power input and output discs 12, 16. Each power roller 10 includes inner ring 22 which is rotatable around a shaft (not identified) and rotatably and slidably disposed between the generally frustoconical sections of respective power input and output discs 12, 16. The power roller 5 includes outer ring 24 located coaxial with the inner ring 22. Ball bearings 20 are rotatably disposed between inner and outer rings 22, 24. Power roller 10 is adapted to controllably swingable in directions indicted by a two-headed arrow in FIG. 5. Power input disc 12, power output disc 16, ball bearings 20, inner ring 22, and/or outer ring 24 correspond to the high bearing pressure-resistant member(s) and therefore are made of the steels according to the present invention.

The entire contents of Japanese Patent Application 2000-145155 (filed May 17, 2000) are incorporated herein by reference.

Although the invention has been described above by reference to certain embodiments or examples of the invention, the invention is not limited to the embodiments or examples described above. Modifications and variations of the embodiments or examples described above will occur to those skilled in the art, in light of the above teachings. The scope of the invention is defined with reference to the following claims.

What is claimed is:

1. A steel for a high bearing pressure-resistant member, having a high machinability, said steel being formed of a machine structural steel comprising carbon in an amount ranging from 0.15 to 0.25% by weighs, silicon in an amount of not less than 0.4% by weight and not more than 1.23% by weight, nickel in an amount ranging from 1 to 3% by weight, chromium in an amount ranging from 1.2 to 3.2% by weight, and molybdenum in an amount ranging from 0.25 to 2.0% by weight, a total amount of chromium and molybdenum amounting to at least 2.71% by weight, said machine structural steel containing carbide precipitated under a heat treatment or spheroidizing, the carbide having an average particle size of not larger than 1 μm and the maximum particle size of not larger than 3 μm, wherein said heat treatment includes maintaining said machine structural steel at a temperature ranging from 700 to 820° C., and cooling said machine structural steel to a temperature of 600° C. at a cooling rate of not higher than 20° C. per one hour.

2. A steel as claimed in claim 1, wherein said carbide contains at least one carbide selected from the group consisting of MC carbide, $M_2C$ carbide, $M_7C_3$ carbide, $M_{23}C_6$ carbide, and $M_6C$ carbide.

3. A steel as claimed in claim 1, wherein said machine structural steel has a Vickers hardness ranging from 180 to 250 after undergoing the spheroidizing heat treatment.

4. A steel as claimed in claim 1, wherein the total amount of chromium and molybdenum is within a range between 2.71 and 3.46%.

5. A steel as claimed in claim 1, wherein said heat treatment is carried out prior to the steel undergoing a rough machining.

6. A high bearing pressure-resistant member made of a steel which has a high machinability and is formed of a machine structural steel comprising carbon in an amount ranging from 0.15 to 0.25% by weight, silicon in an amount of not less than 0.4% by weight and not more than 1.23% by weight, nickel in an amount ranging from 1 to 3% by weight, chromium in an amount ranging from 1.2 to 3.2% by weight, and molybdenum in an amount ranging from 0.25 to 2.0% by weight, a total amount of chromium and molybdenum amounting to at least 2.71% by weight, said machine structural steel containing carbide precipitated under a heat treatment or spheroidizing, the carbide having an average particle size of not larger than 1 μm and the maximum particle size of not larger than 3 μm, wherein said machine structural steel undergoes one of a first treatment and a second treatment after the spheroidizing heat treatment, said first treatment including hardening the machine structural steel by carburizing, and tempering the hardened machine structural steel, said second treatment including hardening the machine structural steel by carbonitriding, and tempering the hardened machine structural steel, wherein said heat treatment for spheroidizing includes maintaining said machine structural steel at a temperature ranging from 700 to 820° C., and cooling said machine structural steel to a temperature of 600° C. at a cooling rate of not higher than 20° C. per one hour.

7. A member as claimed in claim 6, wherein the carbide contains at least one carbide selected from the group consisting of MC carbide, $M_2C$ carbide, $M_7C_3$ carbide, $M_{23}C_6$ carbide, and $M_6C$ carbide.

8. A member as claimed in claim 6, wherein the member comprises a variable transmission member.

9. A member as claimed in claim 6, wherein the member undergoes the first treatment.

10. A member as claimed in claim 6, wherein the member undergoes the second treatment.

11. A member claimed in claim 6, wherein the total amount of chromium and molybdenum is within a range between 2.71 and 3.46%.

12. A method of producing a steel for a high bearing pressure-resistant member, having a high machinability, said method comprising:

preparing a machine structural steel comprising carbon in an amount ranging from 0.15 to 0.25% by weight, silicon in an amount of not less than 0.4% by weight and not more than 1.23% by weight, nickel in an amount ranging from 1 to 3% by weight, chromium in an amount ranging from 1.2 to 3.2% by weight, and molybdenum in an amount ranging from 0.25 to 2.0% by weight, a total amount of chromium and molybdenum amounting to at least 2.71% by weight; and applying a heat treatment for spheroidizing on said machine structural steel so that carbide is precipitated in said machine structural steel, the carbide having an average particle size of not larger than 1 μm and the maximum particle size of not larger than 3 μm, said heat treatment including maintaining said machine structural steel at a temperature ranging from 700 to 820° C., and cooling said machine structural steel to a temperature of 600° C. at a cooling rate of not higher than 20° C. per one hour.

13. A method as claimed in claim 12, wherein:

the carbide contains at least one carbide selected from the group consisting of MC carbide, $M_2C$ carbide, $M_7C_3$ carbide, $M_{23}C_6$ carbide, and $M_6C$ carbide; and said machine structural steel has a Vickers hardness ranging from 180 to 250 after undergoing the spheroidizing heat treatment.

14. A method as claimed in claim 12, wherein the total amount of chromium and molybdenum is within a range between 2.71 and 3.46%.

15. A method as claimed in claim 12, wherein said heat treatment is carried out prior to the steel undergoing a rough machining.

16. A method of producing high bearing pressure-resistant member, having a high machinability, said method comprising:

preparing a machine structural steel comprising carbon in an amount ranging from 0.15 to 0.25% by weight, silicon in an amount of not less than 0.4% by weight and not more than 1.23% by weight, nickel in an amount ranging from 1 to 3% by weight, chromium in an amount ranging from 1.2 to 3.2% by weight, and molybdenum in an amount ranging from 0.25 to 2.0% by weight, a total amount of chromium and molybdenum amounting to at least 2.71% by weight; and applying a heat treatment for spheroidizing on said machine structural steel so that carbide is precipitated in said machine structural steel, the carbide having an average particle size of not larger than 1 μm and the maximum particle size of not larger than 3 μm, said heat treatment including maintaining said machine structural steel at a temperature ranging from 700 to 820° C., and cooling said machine structural steel to a temperature of 600° C. at a cooling rate of not higher than 20° C. per one hour;

machining said machine structural steel to have predetermined shape and dimensions; and applying one of a first treatment and a second treatment on said machine structural steel after the machining, said first treatment including hardening said machine structural steel by carburizing, and tempering said hardened machine structural steel, said second treatment including hardening said machine structural steel by carbonitriding, and tempering said hardened machine structural steel.

17. A method as claimed in claim 16, wherein the carbide contains at least one carbide selected from the group consisting of MC carbide, $M_2C$ carbide, $M_7C_3$ carbide, $M_{23}C_6$ carbide, and $M_6C$ carbide.

18. A method as claimed in claim 16, wherein the member comprises a variable transmission member.

19. A method as claimed in claim 16, wherein the first treatment is applied on said machine structural steel.

20. A method as claimed in claim 16, wherein the second treatment is applied on said machine structural steel.

21. A method as claimed in claim 16, wherein the total amount of chromium and molybdenum is within a range between 2.71 and 3.46%.

22. A method as claimed in claim 16, wherein said heat treatment for spheroidizing is carried out prior to the step of machining.

23. A steel for a high bearing pressure-resistant member, having a high machinability, said steel being formed of a machine structural steel comprising carbon in an amount ranging from 0.15 to 0.25% by weight, silicon in a relatively small amount of not less than 0.4% by weight, nickel in an amount ranging from 1 to 3% by weight, chromium in an amount ranging from 1.2 to 3.2% by weight, and molybdenum in an amount ranging from 0.25 to 2.0% by weight, said machine structural steel containing carbide precipitated under a heat treatment for spheroidizing, therein the total amount of chromium and molybdenum and the conditions of spheroidizing heat treatment are selected such that the carbide has an average particle size of not larger an 1 $\mu$m and a maximum particle size of not larger than 3 $\mu$m, wherein said heat treatment includes maintaining said machine structural steel at a temperature ranging from 700 to 800° C., and cooling said machine structural steel to a temperature of 600° C. at a cooling rate of not higher an 20° C. per one hour.

24. A steel as claimed in claim 23, wherein the total amount of chromium and molybdenum is within a range between 2.71 and 3.46%.

* * * * *